United States Patent [19]

Nasu et al.

[11] Patent Number: 4,656,211

[45] Date of Patent: Apr. 7, 1987

[54] CURABLE RESIN COMPOSITIONS AND THEIR USE

[75] Inventors: Kohji Nasu, Nishinomiya; Fumihiro Doura, Sakai, both of Japan

[73] Assignee: Takeda Chemical Industries, Ltd., Osaka, Japan

[21] Appl. No.: 885,393

[22] Filed: Jul. 10, 1986

Related U.S. Application Data

[63] Continuation of Ser. No. 783,627, Oct. 3, 1985, abandoned.

[30] Foreign Application Priority Data

Oct. 5, 1984 [JP]  Japan ................................ 59-210196
Aug. 23, 1985 [JP]  Japan ................................ 60-186141

[51] Int. Cl.$^4$ ............................................... C08G 18/80
[52] U.S. Cl. ................................. 524/198; 427/385.5; 427/388.1; 427/388.2; 427/393.5; 525/188; 525/330.5; 528/45
[58] Field of Search ............. 524/198; 525/185, 330.5; 528/45; 427/385.5, 388.1, 388.2, 393.5

[56] References Cited

U.S. PATENT DOCUMENTS

| | | | |
|---|---|---|---|
| 3,694,389 | 9/1972 | Levy | 260/23 TN |
| 3,716,599 | 2/1973 | Vasta | 260/859 |
| 4,444,955 | 4/1984 | Mels et al. | 525/124 |

FOREIGN PATENT DOCUMENTS

| | | |
|---|---|---|
| 39797 | 11/1981 | European Pat. Off. . |
| 2068616 | 8/1971 | France . |
| 2104008 | 4/1972 | France . |
| 1056079 | 1/1967 | United Kingdom . |

*Primary Examiner*—Maurice J. Welsh
*Attorney, Agent, or Firm*—Wenderoth, Lind & Ponack

[57] ABSTRACT

A curable resin composition which comprises (1) a copolymer composed of an aminoalkyl acrylate and/or aminoalkyl methacrylate and an ethylenically unsaturated monomer and (2) a blocked polyisocyanate compound formulated therein.

The curable resin composition undergoes curing at by far lowered temperatures as compared with the conventionally employed baking paints consisting of hydroxyl-containing resins and blocked polyisocyanate compounds, and are therefore useful, for example, as a low-temperature baking type paint or adhesive. Heating brings about the crosslinking through the reaction between isocyanate and amino groups, thus providing coating films with excellent flexibility, chemical resistance, water resistance, impact resistance, corrosion resistance, etc. The composition can be used to such substrates as metal, heat-resistant plastics and inorganic materials, and can be applied onto electrical appliances for household uses, automobiles, building materials and the like.

8 Claims, No Drawings

CURABLE RESIN COMPOSITIONS AND THEIR USE

This application is a continuation of now abandoned application Ser. No. 783,627, filed Oct. 3, 1985.

This invention relates to polyurethane-based, curable resin compositions capable of forming coating films with excellent low-temperature curing properties and relates to their use. The resulting coating film excels in flexibility, chemical resistance, water resistance, impact resistance and consequently, is of great use as a baking type paint and an adhesive for metal, heat-resistant plastics, inorganic materials, etc.

Generally, resin compositions for paint uses consisting of a blocked polyisocyanate and a hydroxyl-group containing compound, such as polyester polyol, polyether polyols, acrylic polyols and epoxy resins, possess excellent corrosion resistance, chemical resistance, mechanical properties, etc., and are therefore put in wide use for such baking finishes as exterior painting of automobiles, cation electrodeposition, electrical appliances for household uses, precoat metal and enamelled wires.

The baking type coatings which are generally composed of a blocked polyisocyanate and a hydroxyl-group containing compound, nevertheless, require heating at 140° to 200° C. for curing. Because of this, the cost of energy becomes increased, and the substrates to which such coatings are applied are ordinarily limited to metal articles, whereby they are rarely utilized for substrates with greater specific heats, among others.

In the field of baking finishes for plastics articles, they are applied only to a limited extent on molded articles of thermosetting resins, such as phenol, urea, melamine, unsaturated polyester and epoxy resins, and the room-temperature curing type coating systems, such as lacquer type or two-packed type urethanes, are presently employed for molded articles of PVC, ABS, polypropylene, polyethylene, polycarbonate resins, etc. used in fields related with automobiles and electromagnetic interference.

In view of the circumstances as described above, the present inventors carried out intensive research, and as a result, found that the combination of (1) a copolymer composed of an aminoalkyl acrylate and/or aminoalkyl methacrylate and an ethylenically unsaturated monomer with (2) a blocked polyisocyanate compound yields the coating films which undergo curing at an extremely low temperature of not higher than 140° C. and also exhibit excellent physical properties. These findings have led to the completion of this invention.

Thus, this invention is concerned with curable resin compositions which comprise (1) a copolymer composed of an aminoalkyl acrylate and/or aminoalkyl methacrylate and an ethylenically unsaturated monomer and (2) a blocked polyisocyanate compound formulated therein, and is also concerned with a coating process which comprises applying the above curable resin composition to a substrate and heating at a temperature of not higher than 140° C. for curing.

The copolymer as mentioned above under (1) which is useful in this invention means copolymers composed from an aminoalkyl acrylate and/or aminoalkyl methacrylate of the general formula:

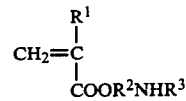

wherein
$R^1$ is hydrogen or methyl group;
$R^2$ is an alkylene or a hydroxyalkylene group of 1 to 6 atoms;
$R^3$ is hydrogen or an alkyl group of 1 to 6 carbon atoms and an ethylenically unsaturated monomer.

Out of the copolymers, those composed from the aminoalkyl acrylate and/or aminoalkyl methacrylate in which Rhu 2 is a hydroxyalkylene group of 1 to 6 carbon atoms are preferable in terms of excellent adhesive properties toward a substrate.

The aminoalkyl acrylate and/or aminoalkyl methacrylate includes, for example, acrylates, such as aminomethyl acrylate, aminoethyl acrylate, aminopropyl acrylate, amino-n-butyl acrylate, aminohexyl acrylate, N-methylaminoethyl acrylate, N-tert-butylaminoethyl acrylate and aminohydroxypropyl acrylate, and methacrylates, such as aminomethyl methacrylate, aminoethyl methacrylate, amino-n-butyl methacrylate, N-methylaminoethyl methacrylate, N-tert-butylaminoethyl methacrylate and aminohydroxypropyl methacrylate. The content of these aminoalkyl acrylates or aminoalkyl methacrylates in the copolymer is normally in the range of about 1 to 40 weight %, preferably in the range of about 5 to 30 weight %.

On the other hand, the ethylenically unsaturated monomer includes, for example, acrylates, such as methyl acrylate, ethyl acrylate, n-butyl acrylate and 2-ethylhexyl acrylate; methacrylates, such as methyl methacrylate, ethyl methacrylate and n-butyl methacrylate; vinyl esters of fatty acids, such as vinyl acetate and vinyl propionate; aliphatic monoolefins, such as ethylene, propylene and isobutene; aromatic monoolefins, such as styrene and vinyltoluene; and other acrylonitrile, vinyl chloride and vinyl fluoride. One kind or not less than two kinds of the above described monomers may be contained in the copolymer, and are contained in the copolymer normally at a ratio in the range of about 60 to 99 weight %, preferably in the range of about 70 to 95 weight %.

The copolymer from an amino alkyl acrylate and/or aminoalkyl methacrylate and an ethylenically unsaturated monomer is advantageously produced for example by way of solution polymerization, whereby as the solvent to be used in such a polymerization reaction, there are preferably employed such solvents as may be utilized as a solvent for the resin compositions in carrying out this invention. Generally, the total monomer concentration is rendered about 20 to 80 weight %, while as a polymerization initiator, there are used oil-soluble, free-radical producing catalysts, such as $\alpha,\alpha'$-azobisisobutyronitrile, benzoyl peroxide, lauroyl peroxide, t-butyl hydroperoxide and cumene hydroperoxide, and if necessary, it is possible to use redox catalysts involving the combined use of reducing substances, as well. As a molecular weight modifier for the copolymer, furthermore, for example, butylmercaptan, dodecylmercaptan, t-dodecylmercaptan and $\beta$-mercaptoethanol may be added in small amounts. The polymerization is carried out at atmospheric pressure and at a temperature in the neighborhood of 30° to 100° C. in an inert gas.

The copolymer thus obtained contains at least two amino groups and exhibits a molecular weight in the range of about 1,000 to 1,000,000, preferably in the range of about 5,000 to 500,000. The copolymer is used as such, and may also be ketiminized with aliphatic ketones and cyclic ketones, such as methyl ethyl ketone, methyl isobutyl ketone and cyclohexanone.

The polyisocyanate to be utilized for the blocked polyisocyanate compound mentioned under (2) which is used in this invention includes, for example, aliphatic diisocyanates, such as trimethylene diisocyanate, tetramethylene diisocyanate, hexamethylene diisocyanate, pentamethylene diisocyanate, 1,2-propylene diisocyanate, 2,3-butylene diisocyanate, 1,3-butylene diisocyanate, 2,4,4- or 2,2,4-trimethylhexamethylene diisocyanate, dodecamethylene diisocyanate and 2,6-diisocyanatomethyl caproate; cycloalkylene-diisocyanates, such as 1,3-cyclopentanediisocyanate, 1,4-cyclohexane-diisocyanate, 1,3-cyclohexane-diisocyanate, 3-isocyanatomethyl-3,5,5-trimethylcyclohexyl isocyanate, 4,4'-methylenebis(cyclohexylisocyanate), methyl-2,4-cyclohexane diisocyanate, methyl-2,6-cyclohexane diisocyanate, 1,4-bis(isocyanatomethyl)cyclohexane and 1,3-bis(isocyanatomethyl)cyclohexane; aromatic diisocyanates, such as m-phenylene diisocyanate, p-phenylene diisocyanate, 4,4'-diphenyldiisocyanate, 1,5-naphthalene diisocyanate, 4,4'-diphenylmethane diisocyanate, 2,4- or 2,6-tolylene diisocyanate, 4,4'-toluidine diisocyanate, dianisidine diisocyanate and 4,4'-diphenyl ether diisocyanate; aromatic aliphatic diisocyanates, such as ω,ω'-diisocyanato-1,3-dimethylbenzene, ω,ω'-diisocyanato-1,4-dimethylbenzene, ω,ω'-diisocyanato-1,4-diethylbenzene, 1,3-tetramethylxylene diisocyanate and 1,4-tetramethylxylene diisocyanate; triisocyanate, such as triphenyl-methane-4,4',4"-triisocyanate, 1,3,5-triisocyanatobenzene, 1,3,5-triisocyanatocyclohexane, 2,4,6-triisocyanatotoluene and ω-isocyanatoethyl-2,6-diisocyanatocaproate; tetraisocyanates, such as 4,4'-diphenyldimethylmethane-2,2',5,5'-tetraisocyanate; and polyisocyanate adducts, or allophanate and biuret derivatives thereof, formed by reacting excess of polymerized polyisocyanates, such as dimers and trimers consisting of monomeric diisocyanates, polymethylenepolyphenyl polyisocyanates or the above-mentioned isocyanate compounds with low-molecular-weight, active-hydrogen containing compounds, such as ethylene glycol, propylene glycol, dipropylene glycol, diethylene glycol, triethylene glycol, 2,2,4-trimethyl-1,3-pentanediol, neopentyl glycol, hexanediol, cyclohexanedimethanol, cyclohexanediol, hydrogenated bisphenol A, xylene glycol, glycerol, trimethylolethane, trimethylolpropane, hexanetriol, pentaerythritol, sorbitol, sorbit, sucrose, castor oil, ethylenediamine, hexamethylenediamine, ethanolamine, diethanolamine, triethanolamine, water, ammonia and urea, or high-molecular-weight, active-hydrogen containing compounds, such as various kinds of polyether polyols, polyester polyols, acrylic polyols and epoxy polyols.

The above-mentioned isocyanate compounds can be used singly or as a mixture of not less than two kinds thereof.

As the blocking agent, which is used for the purpose of blocking the above-mentioned polyisocyanates, there can be employed blocking agents being known to be possibly utilized in the blocking of isocyanates, such as blocking agents based on phenol, lactam, active methylene, alcohol, mercaptan, acid amide, imide, amine, imidazole, urea, carbamate, imine, oxime or sulfite compounds, and among others, blocking agents based on phenol, lactam, alcohol, imine, and oxime compounds are advantageously used.

The blocked polyisocyanate compound, when used in combination with the copolymer (1) undergo curing at by far lowered temperature as compared with the conventionally employed baking paints regardless of the kinds of the blocking agents.

More specifically, the phenol-based blocking agents allow curing at extremely low temperatures in the range of about 50° to 100° C. The lactam-based and oxime-based blocking agents permit curing at about 90° to 120° C. and provide excellent storage stability, further imparting improved physical properties to the resulting coating film. The alcohol-based blocking agents allow curing at about 120 to 140° C., resulting in improvement in storage stability and coating-film physical properties. Specific examples of the blocking agents include the following:

Phenol-based blocking agents:
Phenol, cresol, xylenol, nitrophenol, chlorophenol, ethylphenol, p-hydroxydiphenyl, t-butylphenol, o-isopropylphenol, o-sec-butylphenol, p-nonylphenol, p-t-octylphenol, hydroxybenzoic acid, hydroxybenzoates, etc.

Lactam-based blocking agents:
ε-Caprolactam, δ-valerolactam, γ-butyrolactam, β-propiolactam, etc.

Active-methylene based blocking agents:
Diethyl malonate, dimethyl malonate, ethyl acetoacetate, methyl acetoacetate, acetylacetone, etc.

Alcohol-based blocking agents:
Methanol, ethanol, n-propyl alcohol, isopropyl alcohol, n-butyl alcohol, isobutyl alcohol, t-butyl alcohol, n-amyl alcohol, t-amyl alcohol, lauryl alcohol, ethylene glycol monomethyl ether, ethylene glycol monoethyl ether, ethylene glycol monobutyl ether, diethylene glycol monomethyl ether, diethylene glycol monoethyl ether, propylene glycol monomethyl ether, benzyl alcohol, methoxymethanol, glycolic acid, glycolates, such as methyl glycolate, ethyl glycolate and butyl glycolate, lactic acid, lactates, such as methyl lactate, ethyl lactate and butyl lactate, methylolurea, methylolmelamine, diacetonealcohol, ethylenechlorohydrin, ethylenebromohydrin, 1,3-dichloro-2-propanol, ω-hydroperfluoroalcohol, acetone cyanhydrin, etc.

Mercaptan-based blocking agents:
Butylmercaptan, hexylmercaptan, t-butylmercaptan, t-dodecylmercaptan, 2-mercaptobenzothiazole, thiophenol, methylthiophenol, ethylthiophenol, etc.

Acid-amide based blocking agents:
Acetanilide, acetanisidide, acetotoluide, acrylamide, methacrylamide, acetamide, stearamide, benzamide, etc.

Imide based blocking agents:
Succinimide, phthalimide, maleimide, etc.

Amine based blocking agents:
Diphenylamine, phenylnaphtylamine, xylidine, N-phenylxylidine, carbazole, aniline, naphtylamine, butylamine, dibutylamine, butylphenylamine, etc.

Imiazole based blocking agents:
Imidazole, 2-ethylimidazole, etc.

Urea based blocking agents:
Urea, thiourea, ethyleneurea, ethylenethiourea, 1,3-diphenylurea, etc.

Carbamate based blocking agents:
  Phenyl N-phenylcarbamate, 2-oxazolidone, etc.
Imine based blocking agents:
  Ethyleneimine, propyleneimine, etc.
Oxime based blocking agents:
  Formamidoxime, acetaldoxime, acetoxime, methyl ethyl ketoxime, diacetylmonooxime, benzophenonoxime, cyclohenxanonoxime, etc.
Sulfite based blocking agents:
  Sodium bisulfite, potassium bisulfite, etc.

The production of blocked polyisocyanate compounds is carried out by allowing the above-mentioned polyisocyanate and blocking agent to react in accordance with the known means. This reaction can be conducted in a solvent having no active hydrogen or without solvent. The solvent having no active hydrogen includes, for example, ester solvents, such as ethyl acetate, butyl acetate, cellosolve acetate, carbitol acetate and dimethyl esters of dibasic acids, ketone solvents, such as methyl ethyl ketone, methyl isobutyl ketone and cyclohexanone, and aromatic solvents, such as toluene, xylene, Solvesso ® #100 and Solvesso ® #150.

Specific means for such a reaction includes, for example, a procedure which comprises carrying out reaction of a polyisocyanate with a blocking agent at an NCO/-blocking agent (equivalent ratio) of about 0.9 to 1.1, preferably about 0.95 to 1.0, means of reacting an isocyanate monomer with a blocking agent at an NCO/-blocking agent (equivalent ratio) of about 1.1 to 3.0, preferably about 1.2 to 2.0, followed by reaction with the abovementioned low-molecular-weight, active-hydrogen containing compound and/or high-molecular-weight, active-hydrogen containing compound, and a means of reacting an isocyante monomer with a low-molecular weight and/or high-molecular weight, active-hydrogen containing compound at an NCO/active hydrogen of about 1.5 to 10.0, preferably about 2.0 to 7.0, followed by reaction with a blocking agent. In carrying out the reaction, the known catalyst, such as tertiary amines and organometals, may be used.

The curable resin composition of this invention is obtained by formulating the copolymer as mentioned under (1) with the blocked polyisocyanate as described under (2). The formulation is desirably effected in such a manner as the equivalent ratio of active hydrogen atoms in the copolymer (1) to regenerated isocyanate groups in the blocked polyisocyante compound (2) may be in the range of about 0.3 to 3.0, preferably 0.5 to 2.0.

When the copolymer (1) contains —OH and —NHR$^3$ as an active hydrogen, the copolymer is preferably formulated with the blocked polyisocyante compound in such a manner as the equivalent ratio of —NHR$^3$ to regenerated isocyante groups is about 1 so that —OH in the copolymer (1) may remain unreacted in the coating films.

The coating films show excellent adhesive properties toward a substrate.

Into the above composition, there may be incorporated pigments, additives, such as levelling agents, defoaming agents, dissociation catalysts and UV absorbers, or ketone resins, xylene resins, phenoxy resins, celluloses, vinyl resins, etc.

In this invention, tough coating films can be obtained by applying the curable resin composition to a substrate, followed by heating at a temperature of not higher than 140° C. for curing.

As the substrate, there can be used every kinds of materials, for example, metal such as iron, aluminum, copper, stainless steel, plastic molded articles such as phenol, melamine, urea, unsaturated polyester and epoxy resins and inorganic materials.

The application means includes, for example, air spray, airless spray, roll coater, flow coater, dip coating and electrostatic coating. For heating, there are employed hot air, burner direct fire, infrared or far infrared heater, high frequency, and the like.

The application rate is in such an amount as may provide a coating film of a thickness of about 30 to 50 $\mu$ in the case of electrical appliances for household uses, about 50 to 80 $\mu$ in the case of automobiles and about 15 to 30 $\mu$ in the case of precoat metal.

The curable resin compositions of this invention undergo curing at by far lowered temperatures as compared with the conventionally employed baking paints consisting of hydroxyl-containing resins and blocked polyisocyanate compounds, and are therefore useful, for example, as a low-temperature baking type paint or adhesive. Heating brings about the crosslinking through the reaction between isocyanate and amino groups, thus providing coating films with excellent flexibility, chemical resistance, water resistance, impact resistance, corrosion resistance, etc. Because of this, the compositions can be used to such substrates as metal, heat-resistant plastics and inorganic materials, and can be used as coatings of electrical appliances for household uses, automobiles, building materials, and the like.

The reference example, examples and comparative example are described below to illustrate this invention more specifically. The terms "part" and "%" as shown in the reference example, examples and comparative example denote "part by weight" and "weight %".

REFERENCE EXAMPLE

Production of copolymers
  Copolymer (A)
  A solution with a non-volatile content of 50% of a copolymer with an average molecular weight of 18,000 composed of 70 parts of methyl methacrylate, 15 parts of n-butyl acrylate and 15 parts of aminoethyl methacrylate in toluene/butyl acetate (50/50).
  Copolymer (B)
  A solution with a non-volatile content of 50% of a copolymer with an average molecular weight of 20,000 composed of 30 parts of methyl methacrylate, 30 parts of styrene, 20 parts of ethyl acrylate and 20 parts of amino-n-butyl methacrylate in xylene/butyl acetate (50/50).
  Copolymer (C)
  A solution with a non-volatile content of 50% of a copolymer with an average molecular weight of 18,000 composed of 70 parts of methyl methacrylate, 15 parts of n-butyl acrylate and 15 parts of aminohydroxypropyl methacrylate in toluene/butyl acetate (50/50).
  Blocked polyisocyanate compound (D)
  A solution with a non-volatile content of 60% of a blocked polyisocyanate composed of 582.6 parts of 1,3-bis(isocyanatomethyl)cyclohexane, 134.1 parts of trimethylolpropane and 261.3 parts of methyl ethyl ketoxime in ethyl acetate/ethoxyethyl acetate (50/50).
  Blocked polyisocyanate compound (E)
  A solution with a non-volatile content of 60% of a blocked polyisocyanate composed of 666.9 parts of 3-isocyanatomethyl-3,5,5-trimethylcyclohexyl isocyanate, 134.1 parts of trimethylolpropane and 339.6 parts of ε-caprolactam in ethoxyethyl acetate.

Blocked polyisocyanate compound (F)

A solution with a non-volatile content of 60% of a blocked polyisocyanate composed of 582.6 parts of 1,3-bis(isocyanatomethyl)cyclohexane, 134.1 parts of trimethylolpropane and 32 parts of methanol in ethyl acetate/ethoxyethyl acetate (50/50).

Acrylic polyol

A toluene solution with a non-volatile content of 50% of an acrylic polyol composed of 30 parts of methyl methacrylate, 20 parts of sytrene, 30 parts of n-butyl acrylate and 20 parts of hydroxyethyl acrylate.

EXAMPLE 1

A 862 parts quantity of Copolymer (A), 545 parts of Blocked polyisocyanate compound (D), 505 parts of Tipaque ® CR-90 (titanium oxide, manufactured by Ishihara Sangyo Kaisha, Ltd. of Japan) and 194 parts of xylene were kneaded in a pebble mill for 24 hours to give a white enamel. The white enamel was applied to a 0.8-mm thick mild steel plate treated with iron phosphate to a thickness of coating film of 40 to 50 μm, followed by baking at 110° C. for 30 minutes and at 140° C. for 30 minutes. The coating film showed physical properties as shown in Table 1.

EXAMPLE 2

A 862 parts quantity of Copolymer (A), 634 parts of Blocked polyisocyanate compound (E), 540 parts of Tipaque ® CR-90 and 218 parts of xylene were kneaded by a procedure similar to that of Example 1, and the mixture was applied and baked in a comparable manner to carry out a test on the coating film. The results are shown in Table 1.

EXAMPLE 3

A 785 parts quantity of Copolymer (B), 545 parts of Blocked polyisocyanate compound (D), 480 parts of Tipaque ® CR-90 and 189 parts of xylene were kneaded by a procedure similar to that of Example 1, and the mixture was applied and baked in a comparable manner to carry out a test on the coating film. The results are shown in Table 1.

EXAMPLE 4

A 785 parts quantity of Copolymer (B), 634 parts of Blocked polyisocyanate compound (E), 515 parts of Tipaque ® CR-90 and 213 parts of xylene were kneaded by a procedure similar to that of Example 1, and the mixture was applied and baked in a comparable manner to carry out a test on the coating film. The results are shown in Table 1.

EXAMPLE 5

A 862 parts quantity of Copolymer (A), 416 parts of Blocked polyisocyanate compound (F), 454 parts of Tipaque ® CR-90 and 200 parts of xylene were kneaded by a procedure similar to that of Example 1, and the mixture was applied and baked at 110° C. for 30 minutes in a comparable manner to carry out a test on the coating film. The results are shown in Table 1.

EXAMPLE 6

A 880 parts quantity of Copolymer (C), 545 parts of Blocked polyisocyanate compound (D), 511 parts of Tipaque ® CR-90 and 220 parts of xylene were kneaded by a procedure similar to that of Example 1, and the mixture was applied and baked at 110° C. for 30 minutes in a comparable manner to carry out a test on the coating film. The results are shown in Table 1.

COMPARATIVE EXAMLE

A 1160 parts quantity of Acrylic polyol, 545 parts of Blocked polyisocyanate compound (D), 605 parts of Tipaque ® CR-90 and 209 parts of xylene were kneaded by a procedure similar to that of Example 1, and the mixture was applied and baked in a comparable manner to carry out a test on the coating film. The results are shown in Table 1.

TABLE 1

| | Example 1 | Example 2 | Example 3 | Example 4 | Example 5 | Example 6 | Comparative Example |
|---|---|---|---|---|---|---|---|
| Baking conditions: 110° C. × 30 min. | | | | | | | |
| Hardness (Pencil) | 2H | 3H | H to 2H | 2H to 3H | 2H | 2H | B. |
| Ethyl acetate rubbing test (50 times) | Passed | Passed | Passed | Passed | Passed | Passed | Dissolved |
| Bending test (mmφ) | 2 | 4 | 2 | 3 | 3 | 2 | 10 cracked |
| Erichsen cupping test (mm) | 7.0 | 5.5 | 7.5 | 5.5 | 5.5 | 8.5 | 0 |
| Acid resistance test (5% H$_2$SO$_4$, 7 days) | Passed | Passed | Passed | Passed | Passed | Passed | Peeled off |
| Alkali resistance test (5% NaOH, 7 days) | Passed | Passed | Passed | Passed | Passed | Passed | Dissolved |
| Baking conditions: 140° C. × min. | | | | | | | |
| Hardness (Pencil) | 2H to 3H | 3H | 2H | 3H | | | H to 2H |
| Ethyl acetate rubbing test (50 times) | Passed | Passed | Passed | Passed | | | Passed |
| Bending test (mmφ) | 3 | 4 | 2 | 4 | | | 3 |
| Erichsen cupping test (mm) | 6.5 | 5.0 | 7.0 | 5.0 | | | 6.5 |
| Acid resistance test (5% H$_2$SO$_4$, 7 days) | Passed | Passed | Passed | Passed | | | Passed |
| Alkali resistance test (5% NaOH, 7 days) | Passed | Passed | Passed | Passed | | | Slightly deteriorated |

TABLE 1-continued

|  | Example 1 | Example 2 | Example 3 | Example 4 | Example 5 | Example 6 | Comparative Example |
|---|---|---|---|---|---|---|---|
|  |  |  |  |  |  |  | luster |

Note:
Hardness: Hardness as determined from a degree of scratch caused by Mitsubishi Pencil UNI
Ethyl acetate rubbing test: The test was carried out by the procedure of soaking antiseptic gauze with ethyl acetate and rubbing the applied coating surface with it.
Bending test: The test was conducted by use of a Mandrel bending tester.
Erichsen test: The height of a cup pressed out by an Erichsen testing machine was measured.
Acid resistance test and Alkali resistance test: A test piece was immersed in a test solution at room temperature for any change in the applied coating surface.

What is claimed is:

1. A curable resin composition which comprises (1) a copolymer composed of an aminoalkyl acrylate and/or aminoalkyl methacrylate and an ethylenically unsaturated monomer and (2) a blocked polyisocyanate compound with an alcohol-based blocking agent and/or a lactum-based blocking agent formulated therein.

2. A curable resin composition as claimed in claim 1, wherein the aminoalkyl acrylate and/or aminoalkyl methacrylate in the copolymer is one represented by the general formula:

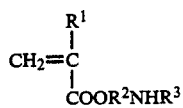

wherein $R^1$ is hydrogen or methyl,
$R^2$ is an alkylene or a hydroalkylene group of 1 to 6 carbon atoms and
$R^3$ is hydrogen or an alkyl group of 1 to 6 carbon atoms.

3. A curable resin composition as claimed in claim 1, wherein the content of the aminoalkyl acrylate and/or aminoalkyl methacrylate in the copolymer is in the range of about 1 to 40 weight %.

4. A curable resin composition as claimed in claim 1, wherein the ethylenically unsaturated monomer is an acrylate and/or methacrylate.

5. A curable resin composition as claimed in claim 1, wherein the equivalent ratio of active hydrogen atoms in the copolymer (1) to regenerated isocyanate groups in the blocked polyisocyanate compound (2) is in the range of about 0.3 to 3.0.

6. A curable resin composition as claimed in claim 1, wherein the blocked polyisocyanate compound is one obtained by reaction of a polyisocyanate adduct from an isocyanate compound and a low-molecular-weight, active-hydrogen containing compound with an alcohol-based blocking agent and/or a lactum-based blocking agent.

7. A curable resin composition as claimed in claim 6, wherein the blocking agent is a lactum-based blocking agent.

8. A curable resin composition as claimed in claim 6, wherein the blocking agent is an alcohol-based blocking agent.

* * * * *